United States Patent [19]

Lowe et al.

[11] Patent Number: 5,012,257

[45] Date of Patent: Apr. 30, 1991

[54] INK JET COLOR GRAPHICS PRINTING

[75] Inventors: David J. Lowe; Thomas B. Pritchard, both of Vancouver, Wash.

[73] Assignee: Hewlett-Packard Company, Palo Alto, Calif.

[21] Appl. No.: 495,011

[22] Filed: Mar. 16, 1990

[51] Int. Cl.[5] .............................................. B41J 2/21
[52] U.S. Cl. ................................. 346/1.1; 346/140 R; 358/75; 358/78; 364/519
[58] Field of Search ......................... 346/1.1, 75, 140; 358/75, 78, 458, 298; 364/518, 519

[56] References Cited

U.S. PATENT DOCUMENTS

| | | | |
|---|---|---|---|
| 4,412,226 | 10/1983 | Yoshida | 346/1.1 |
| 4,593,295 | 6/1986 | Matsufuji et al. | |
| 4,617,580 | 10/1986 | Miyakawa | |
| 4,620,196 | 10/1986 | Hertz et al. | |
| 4,630,076 | 12/1986 | Yoshimura | |
| 4,673,951 | 6/1987 | Motoh | 346/75 |
| 4,677,571 | 6/1987 | Riseman | 364/519 |
| 4,714,964 | 12/1987 | Sasaki | 346/1.1 X |
| 4,748,453 | 5/1988 | Lin et al. | 346/1.1 |

OTHER PUBLICATIONS

Hewlett Packard Paintjet Manual excerpt dated Apr., 1987.

Primary Examiner—Joseph W. Hartary

[57] ABSTRACT

In a color ink jet printing system, an image superpixel (84, 86, 88) consists of a 2 by 2 array of cells (1-4), each cell corresponding to a pixel area on the substrate (80). Each pixel (55) of graphics data is processed to form a 2 by 2 array of bit image data (40), for printing a corresponding superpixel image (68). A superpixel configuration (86), indicating cell location and color of drops of ink for forming a superpixel image, is defined for each desired image color. Superpixel configurations control printing so that drops of ink (Y,M,C) are deposited only an a diagonally adjacent pair of cells (1,4), with no more than two drops of ink per cell, and no more than three drops of ink per superpixel. This superpixel strategy provides for printed images (62,64) perceivable as having the desired image color and having good color saturation, while minimizing bleed across color field boundaries (66).

20 Claims, 15 Drawing Sheets

INK JET COLOR GRAPHICS PRINTING

BACKGROUND OF THE INVENTION

This invention relates to the field of liquid ink printing systems and, more particularly, to a method for improved print quality and color density in color ink jet printing systems.

A typical ink jet printing system includes a platen for supporting a substrate such as paper on which an image is to be printed. A drive means such as a motor is provided for advancing the platen and thereby advancing the paper. A print head having one or more nozzles for ejecting drops of ink or a similar liquid printing solution is mounted on a motor-driven carriage. The carriage is moveable along a path transverse to the paper advancement path, and supports the print head with the nozzle(s) facing the platen in an adjacent yet slightly spaced-apart relationship. Platen (paper) position and carriage location combine to position the print head opposite a desired location on the paper.

Ink jet print heads include at least one and often a plurality of print nozzles. In the latter case, the print nozzles typically form a linear array, arranged vertically with respect to the printing medium (i.e., along a line parallel to the direction of paper advancement). For color ink jet printing, the print head typically includes nozzles for ejecting cyan, magenta and yellow colored ink, called the primary printing colors, or simply "primaries." Some systems additionally include nozzles for ejecting black ink. A print head array may also include several nozzles for ejecting each color of ink. In a preferred embodiment described below, the print head includes sixteen nozzles for each of the three (C, M and Y) primaries. A controller, for example, a microprocessor system including associated memory and interfacing electronics, controls the platen drive means, carriage motor and print head.

Printing occurs as the print head traverses across the width of the paper (a "pass"). During each pass all sections of the head are printing, each section printing on a different horizontal band of the paper. Between passes of the print head, the paper is advanced a distance equal to the height of one color section of the head. Paper advances past the printing head from the bottom, passing the cyan primary first. Printing is not completed until all three primaries have passed over the same band on the paper, to allow mixing the primary colors. The drops of ink strike the paper or other substrate and then dry to form dots that, when viewed together, create the permanently printed image. Desired image colors are created by combining drops of ink of the primary colors. The individual dots, typically located on 1/300 inch centers, are not discernable to the naked human eye so that arrays of dots can be printed to form what appear to be solid fields of a desired color.

The fundamental unit of printing area on the paper is commonly referred to as a pixel. The nominal pixel size or spacing is equal to the spacing between nozzles on the print head. The speed of the carriage and the frequency of ejecting drops of ink are controlled by the controller to allow depositing successive drops of ink along a horizontal line having a spacing similar to the vertical spacing of the nozzles on the print head. The paper may thus be considered as a regular array of pixel areas, for example, consisting of 300 pixel areas per inch in both directions.

Alternatively, pixels may be visualized as lying on the nodes of a raster of regularly arranged points in two dimensions. In either case, the pixels are not physically marked on the printing medium other than by dots upon printing. They form a useful convention because they permit an assessment of the dotted image quality actually printed compared to a hypothetical ideal standard pixel array. Since it is the visual appearance of the image that is most important, the use of the pixel location concept also permits comparisons of different methods of forming images using various dot deposition strategies.

An important consideration in printing strategies in an ink jet printing system is the intended printing medium. For example, overhead transparencies (OHT) have less affinity for absorbing ink than does a typical paper. As a result, drops of ink deposited on an OHT tend to bead rather than diffuse, as compared to drops deposited on paper. Additionally, the drops of ink deposited on OHT take longer to dry.

U.S. Pat. No. 4,748,453 (Lin et al.) discloses a method of depositing spots of liquid ink upon selected pixel centers on overhead transparencies so as to prevent the flow of liquid ink from one spot to an overlapping adjacent spot. According to that method, a line of information is printed in at least two passes so as to deposit spots of liquid ink on selected pixel centers in a checkerboard pattern, wherein only diagonally adjacent pixel areas are deposited in the same pass. On the second pass, the complementary checkerboard pattern is deposited, thereby completing deposit of ink on all of the pixels in a desired area.

U.S. Pat. No. 4,617,580 (Miyakawa) is directed to improving color saturation in depositing drops of liquid ink on overhead transparencies, by printing multiple drops on each pixel location, each drop being slightly offset horizontally and/or vertically from an adjacent drop.

Printing on paper, however, presents a different problem. Paper has an affinity for the liquid ink so that substantial absorption and diffusion of each drop of ink generally occurs. On the one hand, diffusion from one drop of ink to a drop that occupies an adjacent pixel area is helpful in achieving color mixing and obtaining a solid appearance. Along a boundary between two adjacent fields of different colors, however, such diffusion results in color bleeding across the boundary, making the boundary appear fuzzy. This is an undesirable result.

Most color ink jet printers form desired image colors by depositing two or more droplets of ink of different primary colors, one over the other, on a selected pixel area of the substrate. The net visual effect is a dot of a secondary color determined by the principles of transmitted or reflected color formation. Overprinting two drops of ink on each pixel area results in high color saturation (200%), but also leads to substantial bleeding across color field boundaries, resulting in poor image quality.

In a symmetric array of pixel areas, it follows from the geometry that diagonally adjacent pixel centers are spaced farther apart than horizontally or vertically adjacent pixel centers, by a factor of the square root of 2. Bleeding among adjacent drops of ink thus can be reduced by printing only on diagonally adjacent pixel areas in a checkerboard pattern. However, checkerboard printing leaves 50% unprinted or "white" area, giving the printed area an undesirable pale appearance.

A need remains for a printing method that can provide good color saturation for a solid appearance in a color image while minimizing bleeding across color field boundaries.

SUMMARY OF INVENTION

An object of the present invention is to improve image quality in color ink jet graphics printing.

Another object is to implement a graphics printing strategy to reduce bleed across color field boundaries, while providing good color saturation.

Yet another object is to design and implement ink drop configurations for forming printed images having good color saturation while minimizing bleed across color field boundaries.

The present invention is a method of printing a pixel of graphics data in a color ink jet printing system. One aspect of such method includes defining as an image superpixel an area of the substrate corresponding to one pixel of graphics data and consisting of a 2 by 2 array of pixel areas. A superpixel configuration includes a 2 by 2 array of cells. Each cell corresponds to a pixel area of the substrate and contains decomposed color data that is used to determine the color of ink drops deposited in the corresponding pixel area on the substrate.

First and second respective units of ink are deposited on two diagonally adjacent areas of the substrate corresponding to a selected diagonally adjacent pair of cells of the superpixel. Two diagonally adjacent areas of the substrate in positions corresponding to the nonselected pair of cells in the superpixel are left white. A third unit or drop of ink is deposited on a selected one of the areas of the substrate corresponding to the selected pair of cells. Three units of ink thus are deposited on two diagonally adjacent areas of the substrate corresponding to the selected pair of cells in the superpixel. A similar strategy can be used to process each pixel of graphics data. A predetermined, diagonally adjacent pair of cells is printed for each superpixel, thereby forming a checkerboard pattern of spots of ink on the substrate.

The printing system can include a plurality of primary printing colors of liquid ink and each pixel of graphics data can include an indication of an image color. Another aspect of the invention includes selecting a pair of the primary printing colors that combine to form the indicated image color. Liquid ink of one of selected pair of colors is used as the first and second units of ink mentioned above. Ink of the other color is used as the third unit of ink. An image superpixel perceivable as having the indicated image color is thereby formed.

The step of depositing ink on the substrate further includes determining the indicated image color from the pixel data. If the indicated color is one of the primary printing colors, ink of the indicated color is deposited on an area of the substrate corresponding to either one or both of the selected pair of cells. The pixel data is thereby printed at approximately 25% color saturation (one cell printed) or 50% color saturation (both cells printed).

If the indicated color is not one of the primary colors, the method calls for selecting first and second ones of the primary colors that combine to form the indicated color. One unit of ink of the first primary color is deposited on one of the selected pair of cells. One unit of ink of the second primary color is deposited on the other selected cell, thereby forming an image superpixel perceivable as having the indicated image color. A second unit of ink of the first primary color can be deposited on the latter one of the selected pair of cells to improve color saturation.

Another aspect of the invention includes defining a set of desired image colors including the image colors indicated in the pixels of graphics data. For each one of the set of image colors, a corresponding superpixel configuration is defined, the superpixel configuration having four cells arranged in a two by two array. Each cell in the array corresponds to a pixel area on the substrate, and includes data for controlling deposit of drops of ink on the corresponding pixel area. For each pixel of graphics data, the method calls for selecting a superpixel configuration that corresponds to the indicated image color. Each cell of the selected superpixel configuration is transformed to form a corresponding bit of bit-image data for each primary color.

Defining a superpixel configuration preferably includes, for each primary color, defining a respective primary configuration corresponding to the superpixel configuration. Each primary configuration includes a logical datum corresponding to each cell in the superpixel configuration and indicating whether or not the printed superpixel image is to include a drop of ink of such primary color on an area of the substrate corresponding to such cell.

Another aspect of the invention is a color ink jet printing system for implementing a superpixel printing strategy. The system comprises an input for receiving pixels of multi-plane graphics data; a memory for storing superpixel configuration data including superpixel configuration data for each of a plurality of primary colors; and a color palette coupled to the memory for storing configuration data for a selected primary color. A rotator is coupled to the input means for concatenating the bits in each pixel to form an index indicating an image color. The index controls a multiplexor to select a column in the color palette that contains data corresponding to the desired image color.

The foregoing and other objects, features and advantages of the invention will become more readily apparent from the following detailed description of a preferred embodiment which proceeds with reference to the drawings.

BRIEF DESCRIPTION OF THE DRAWINGS

FIG. 8 is a flow chart of the Process Task of FIG. 4.

FIG. 9 is a conceptual diagram illustrating a preferred method of transforming multi-plane raster graphics data to bit image data according to the present invention.

FIG. 10 is a flow chart of the Print Rows step of the flow chart of FIG. 8.

FIGS. 11-13 are flow charts of the Process Y, Process M and Process C steps, respectively, of the flow chart of FIG. 10.

FIGS. 14-16 are flow charts of the Fill from Yptr, Fill from Mptr and Fill from Cptr steps of FIGS. 11-13, respectively for filling the rotator of FIG. 9.

FIG. 17 is a flow chart of the Empty Rotator step employed in the flow charts of FIGS. 11-13.

DETAILED DESCRIPTION OF A PREFERRED EMBODIMENT

Print Data Flow And Structures

Figure 4:
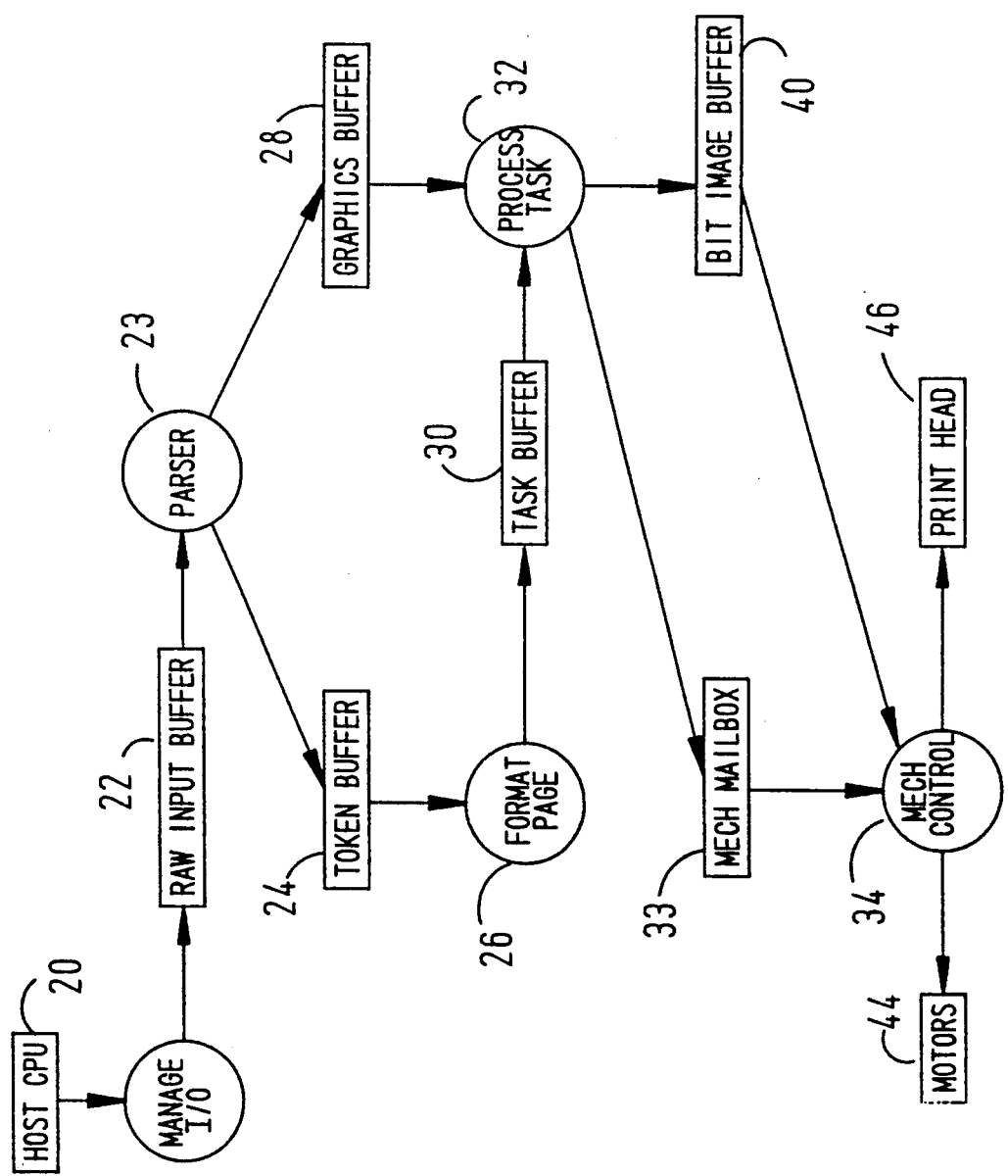
FIG. 4 is a data flow diagram associated with a printing system of a type suitable for implementing the present invention.

Referring to FIG. 4, input data to be printed is taken from a host central processing unit (CPU) 20 and processed in a controller (not shown) which conventionally comprises a microprocessor, a control program ROM, a data memory and associated control and interface circuitry. FIG. 4 shows the data flow and control elements used in the controller to implement invention. Input data from CPU 20 is initially stored in a raw input buffer 22. Data in the raw input buffer is parsed (parser 23) and converted to tokens (token buffer 24) which are passed on to a page formatter 26.

Graphics data is accumulated in a separate graphics buffer 28. As the page formatter 26 composes the page, it creates tasks for the print mechanism which are passed through a task buffer 30 to a process task module 32. The task processor 32 takes the tasks created by the formatter and prepares them for consumption by the mechanism control code 34.

Graphics data from the graphics buffer 28 is transformed by the process task 32 to form bit image data in the bit image buffer 40 for easier access by the mechanism control code. The mechanism control 34 runs the motors 44 and feeds the print head 46 with data from the bit image buffer 40. The superpixel strategy for color printing is effected within this data transformation from raster plane graphics format to a bit image format.

This transformation occurs within the process task module 32 of the system firmware. Before describing the process task in greater detail, it is helpful to examine the data structures employed in this system.

Data Structures

Figure 5:
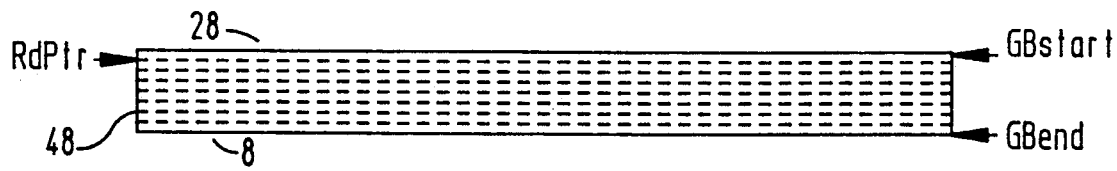
FIG. 5 is a conceptual diagram of the contents of the graphics buffer of FIG. 4.

FIG. 5 is a conceptual diagram of the graphics buffer 28 of FIG. 4. The graphics buffer includes 8 multi-plane raster rows. Also shown in FIG. 5 are pointers RdPtr (pronounced "read-pointer"); GBstart (pronounced "GB-start"); and GBend (pronounced "GB-end"). These pointers are discussed below.

Figure 6:
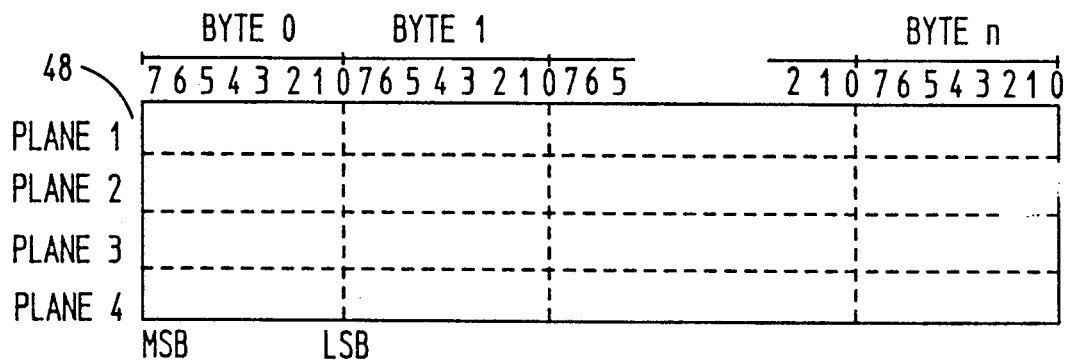
FIG. 6 is a conceptual diagram of one multi-plane raster graphics row of the graphics buffer of FIG. 5.

FIG. 6 is a conceptual diagram of one of the multi-plane raster rows, e.g., row 48, of the graphics buffer of FIG. 5. The raster row consists of a plurality of bytes, numbered from Byte 0 at the left through Byte n at the right of the figure. Each byte consists of 8 bits, numbered 0-7 from the LSB to the MSB positions, respectively, although the byte size is, of course, a matter of design choice and may vary from one system to another. Each plane of a single raster row of FIG. 5 is represented as a distinct row in FIG. 6 (Plane 1 through Plane 4).

Figure 7:
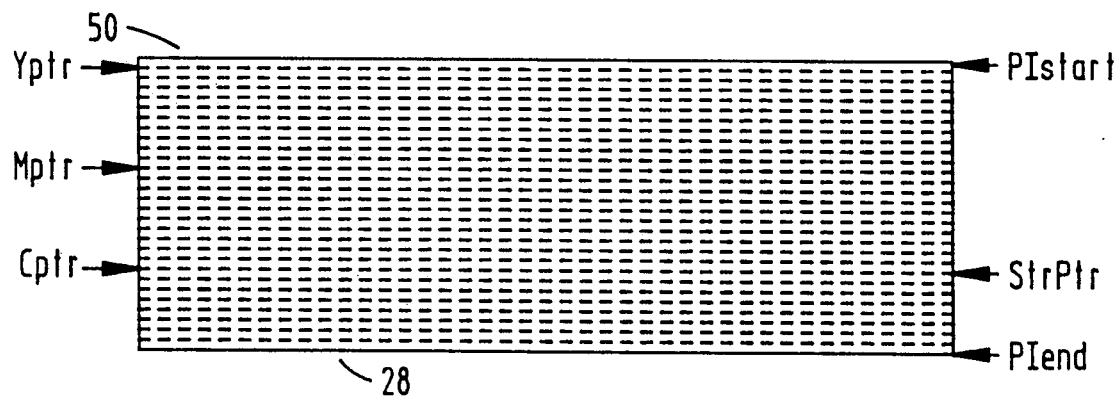
FIG. 7 is a conceptual diagram of a plane image buffer for processing graphics data in a preferred embodiment of the present invention.

FIG. 7 is a conceptual diagram of a plane image buffer 50 consisting of 28 multi-plane raster rows. Also shown in FIG. 7 are Y, M and C color pointers (Yptr, Mptr, and Cptr), plane image start and end pointers (PIstart, PIend) and a store pointer (StrPtr).

The number of planes of the graphics buffer and plane image buffer may vary to accommodate additional colors or other kinds of graphics data. The present system employs four planes of data, so that each pixel or position of graphics data includes four bits. Four bits of data allow selection of one of 16 image colors. This arrangement is adequate for selecting among the 16 colors shown in FIG. 3.

As discussed in further detail below with reference to FIG. 9, the data in the plane image buffer 50 is processed to form bit image data for forming image superpixels in accordance with the invention. First, however, the print head arrangement and superpixel printing strategy are described.

Print Head Arrangement

Figure 1:
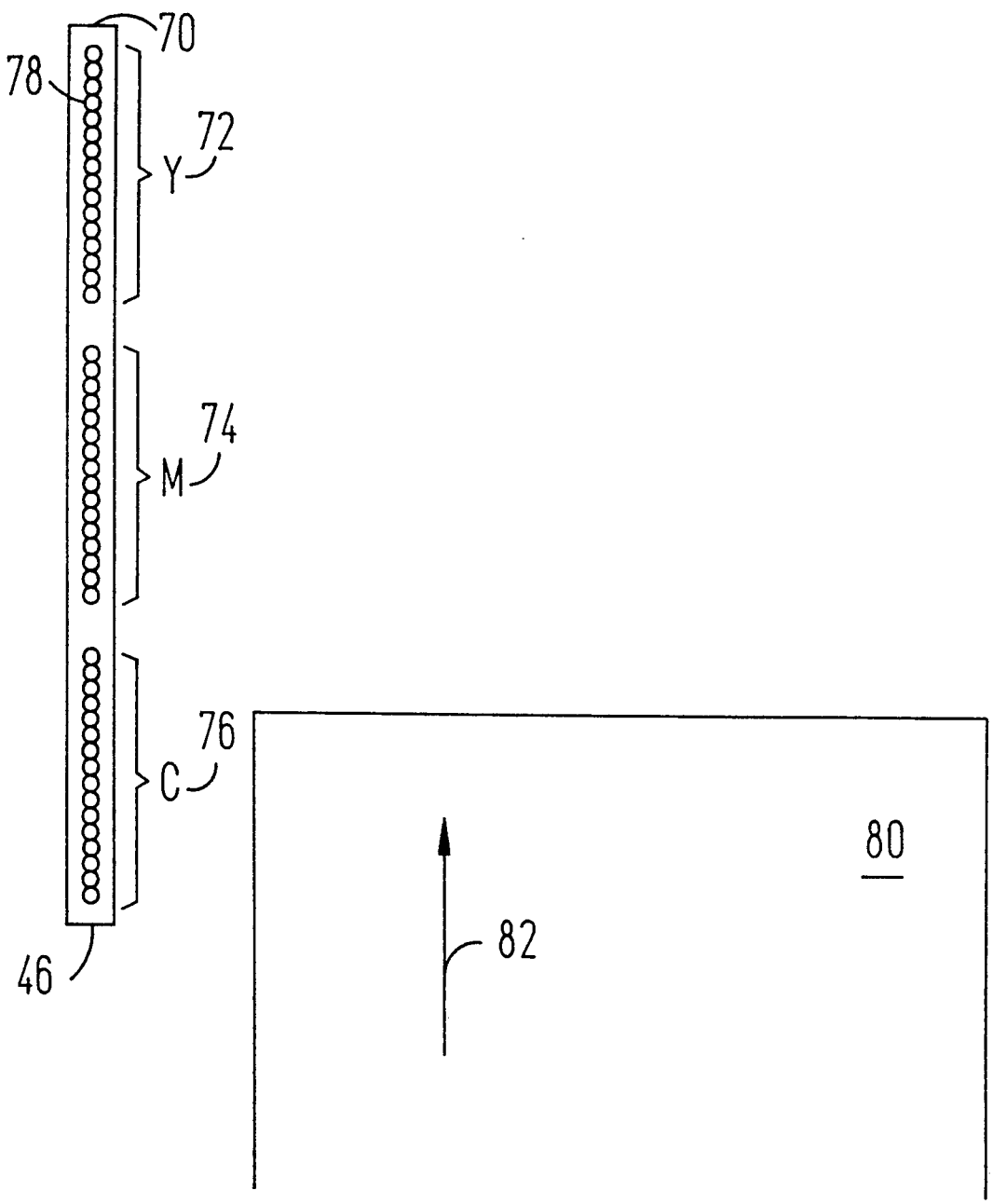
FIG. 1 is a schematic representation of a three-color ink jet print head showing its orientation relative to paper in an ink jet printing system.

FIG. 1 illustrates a color ink jet print head 46 having a linear array 70 of nozzles or orifices 78. The nozzles form a Y (yellow) section 72; an M (magenta) section 74 and a C (cyan) section 76. Each section includes 16 nozzles. In one example of an operative embodiment, the nozzles within each section are spaced on 1/300 inch centers. The sections are spaced an additional 4/300 inch apart, so the total height of the print head 70, top nozzle center to bottom nozzle center, is 55/300 inch. The nozzle spacing determines the nominal print image pixel size, as the smallest unit of ink is one drop, ejected onto a substrate from one of the print nozzles.

A printing substrate 80, such as paper, is aligned parallel to the print nozzle array. In use, drops of ink are selectively ejected from the nozzles onto the paper as the print head traverses a path across the paper. The paper is advanced in the direction indicated by arrow 82 past the print head when the head is not printing, for example, between passes.

Data provided to the printing system includes raster graphics data. Raster graphics data in a color printing system comprises rows of multi-plane bits or pixels. In the prior art, each pixel of raster graphics data corresponds one-to-one to a single pixel area on the substrate. The pixel of graphics data includes an indication of an image color for printing on the corresponding pixel area of the substrate.

Figure 2:
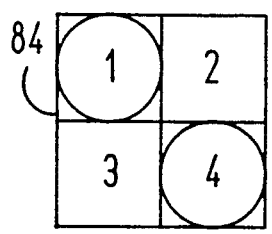
FIG. 2 illustrates the configuration of a superpixel according to the present invention.

According to the present invention, each pixel of raster graphics data is transformed to define an image superpixel area on the printing medium. An image superpixel consists of a two by two array of cells. FIGS. 2 illustrates an image superpixel 84, in which the four cells are numbered (1-4). Each cell of an image superpixel corresponds to a pixel area on the paper. The circles shown in cells 1 and 4 each represent a drop of ink deposited on that cell. Absence of a circle in cells 2 and 3 indicates that those cells are left "white", i.e., not printed.

Superpixel Printing Strategy

Ink drops are deposited only on one or both of a diagonally adjacent pair of the cells within an image superpixel. For example, in FIG. 2, ink drops are deposited on each of diagonally adjacent cells 1 and 4 while cells 2 and 3 are left white. Alternatively, cells 2 and 3 could be printed and cells 1 and 4 left white. The selection of a diagonally adjacent pair of cells, however, must be consistent over all of the image superpixels within a single printed image. Accordingly, depositing single drops of ink in all of the allowable cells over an array of superpixels produces a checkerboard pattern of ink drops.

Figure 3:
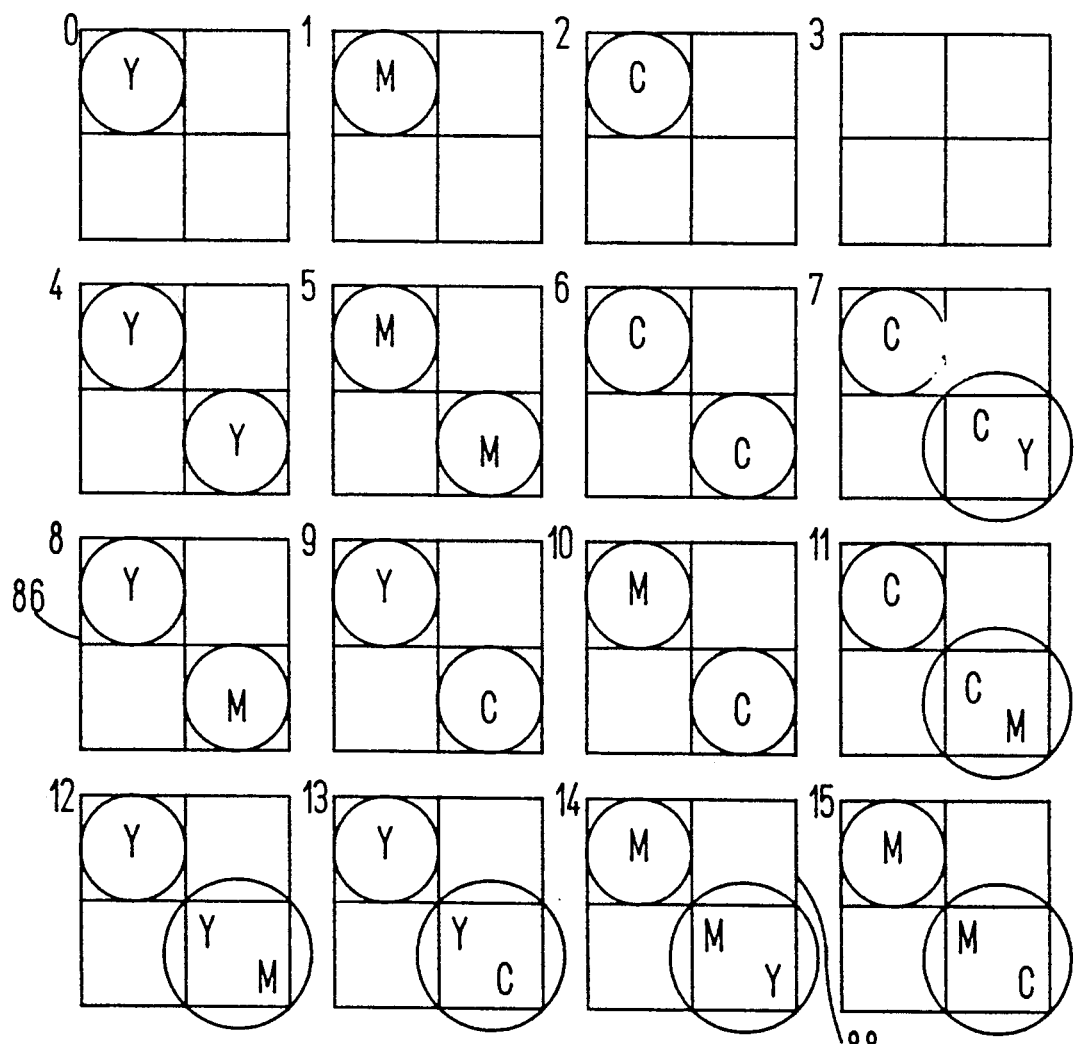
FIG. 3 illustrates a preferred set of configurations for depositing drops of primary printing color ink on superpixel cell locations according to the present invention.

Desired image colors are created for each superpixel by mixing primaries subject to the following restrictions. First, primary colors can be placed only in the allowable pixel positions, for example, cells 1 and 4 in FIG. 2 as described above. Additionally, no more than three drops of ink are allowed within one superpixel. Either one (but not both) of the selected pair of cells thus can be overprinted with a second drop of ink. FIG. 3 illustrates a preferred application of this printing strategy, showing 16 superpixel configurations consistent with the restrictions just mentioned.

Other superpixel configurations are possible, for example, to achieve different hues in a printed image. Some systems includes a fourth ink color, often black. The superpixel strategy may be implemented in such systems as well, in a manner that will be apparent in view of disclosure herein.

Referring to FIG. 3, each of the 16 boxes represents an image superpixel configuration, for example, superpixel 86. Each superpixel is divided into a two by two array of cells. Drops of ink are represented by a circle along with a letter indicating the primary ink color. Y represents yellow, M represents magenta, and C represents cyan. Where a second drop of ink is overprinted on a given cell, an enlarged circle containing two letters indicates the two primary colors deposited on that cell. The superpixel configurations of FIG. 3 may be numbered, beginning with 0 in the upper left corner, increasing from left to right and increasing with each successive row, so that the superpixel in the lower right corner is number 15, and superpixel 86 is configuration number 8.

The superpixel configurations illustrated in FIG. 3 may be decomposed to form primary configurations with respect to each primary color. Table 1, below, shows the Y primary superpixel configurations. In Table 1, 16 columns are numbered 0 through 15, corresponding to the 16 configurations of FIG. 3. The Table consists of four data rows, corresponding to the four cells of a superpixel (FIG. 2). Each datum is a binary variable. A one (1) indicates that the printed image superpixel includes a drop of yellow ink on the area of the substrate corresponding to that cell. A zero (0) indicates that yellow ink is not deposited on the corresponding area of the substrate.

TABLE 1

| | | | | | | Y primary Superpixel Configurations | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| 1 | 0 | 0 | 0 | 1 | 0 | 0 | 0 | 1 | 1 | 0 | 0 | 1 | 1 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 1 | 0 | 0 | 1 | 0 | 0 | 0 | 0 | 1 | 1 | 1 | 0 |

To illustrate, referring to FIG. 3, superpixel 86 (number 8) consists of a drop of yellow color ink in cell 1 and a drop of magenta color in cell 4. Referring now to Table 1, column number 8 corresponds to superpixel number 8. It contains binary data 1-0-0-0, corresponding to cells 1 through 4, respectively. The yellow drop in cell 1 of superpixel 86 is indicated by a 1 in column 8, first row. Table 1 represents only placement of yellow primary drops of ink.

Table 2 shows the magenta primary superpixel configurations, corresponding to the configurations of FIG. 3 in the same fashion as Table 1 applies to the yellow primary. To complete the above example, a 1 in column 8, fourth row of Table 2 indicates the drop of magenta ink on cell 4 of superpixel 86.

TABLE 2

| | | | | | | M primary Superpixel Configurations | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| 0 | 1 | 0 | 0 | 0 | 1 | 0 | 0 | 0 | 0 | 1 | 0 | 0 | 0 | 1 | 1 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 1 | 0 | 0 | 1 | 0 | 0 | 1 | 1 | 0 | 1 | 1 |

Similarly, Table 3 shows the cyan primary superpixel configuration. As indicated by zeroes in all rows of column 8, cyan is not used in configuration number 8.

TABLE 3

| | | | | | | C primary Superpixel Configurations | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| 0 | 0 | 1 | 0 | 0 | 0 | 1 | 1 | 0 | 0 | 0 | 1 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 1 | 1 | 0 | 1 | 1 | 1 | 0 | 1 | 0 | 1 |

As a second illustration, refer to superpixel configuration 88 (number 14) in FIG. 3. A drop of magenta ink is indicated in cell number 1 and a second drop of magenta ink, along with a drop of yellow ink, are shown together in cell number 4. That combination forms a red image color with greater than 50% color saturation. Referring to Table 1 (yellow), column 14 shows a 1 only in the fourth row, indicating the drop of yellow primary deposited on cell number 4. Referring to Table 2 (magenta), column 14 shows a 1 in the first and fourth rows, corresponding to the drops of magenta ink in cells 1 and 4 of superpixel 88.

Figure 18:
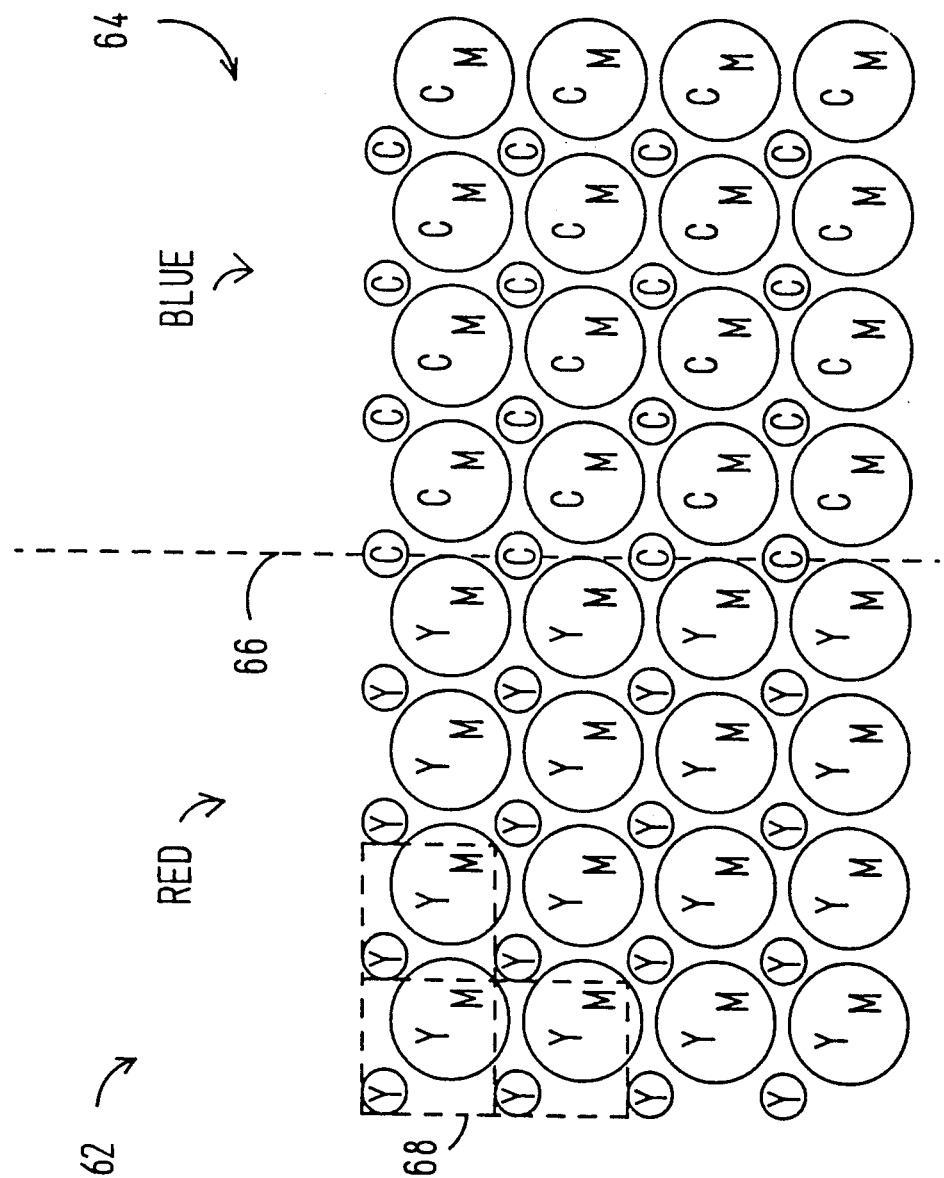
FIG. 18 illustrates an image printed according to present invention that includes adjacent areas of red and blue.

FIG. 18 illustrates a printed image formed of drops of ink arranged in superpixels, such as superpixel 68, according to the strategy described above.

The primary configurations are maintained as data in a memory in a printer system, so that they are available for lookup as needed. The memory may be ROM, for example. As will be described below, the primary configurations are loaded into a color palette (56 in FIG. 9) as needed. Alternative primary configurations may be stored to provide for changing image hue under software control. Primary configuration data could be provided by a plug-in cartridge or downloaded, as is known for character fonts in printing systems.

Implementation of the Superpixel Printing Strategy

In general, graphics data is taken from a first eight rows (beginning at row number =Yptr) of the Plane Image Buffer. The data is processed using the Y primary superpixel configurations (Table 1), to form bit image data in the first 16 rows of the bit image buffer. These data will control the 16 yellow ink nozzles on the print head.

The next eight rows of data, starting at Mptr, are processed using the M configurations to form bit image data in the next 16 rows of the bit image buffer, to control the 16 magenta ink nozzles on the print head. Similarly, a third eight rows of graphics data, starting at Cptr, are transformed to provide 16 rows of bit image data to control the cyan section of the print head (FIG. 1).

After each primary is processed, the respective pointer is incremented by 8 rows, the same amount as the paper is advanced. After all three primary colors are processed, the print head traverses the substrate, depositing drops of ink in accordance with the bit image data. Then the substrate is advanced by one section of the print head, corresponding to eight rows of graphics data.

Figure 13:
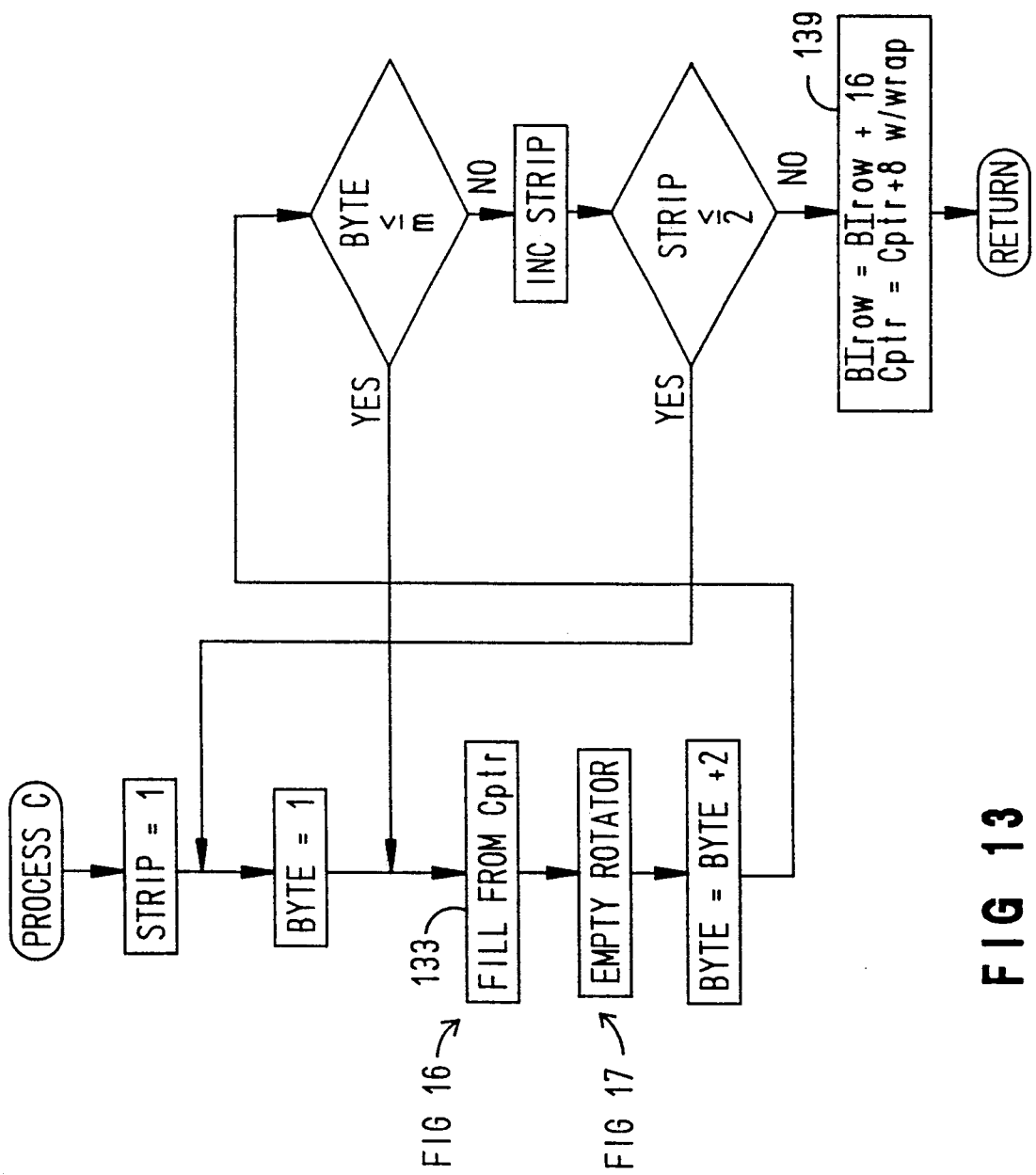

Next, the process is repeated, but first the first eight rows of graphics data are replaced with new data. The new data is processed with respect to the cyan primary, as Cptr was incremented by eight and wrapped around when C was last processed (FIG. 13). The second eight rows are next processed using the yellow primary configurations, and the third eight rows are processed with respect to the magenta primary.

Again, after all three primaries are processed, the print head makes a second pass. On the second pass, cyan ink is added to the first eight printed rows, yellow is added to the second eight rows, and magenta is added to the third eight rows.

Figure 8:
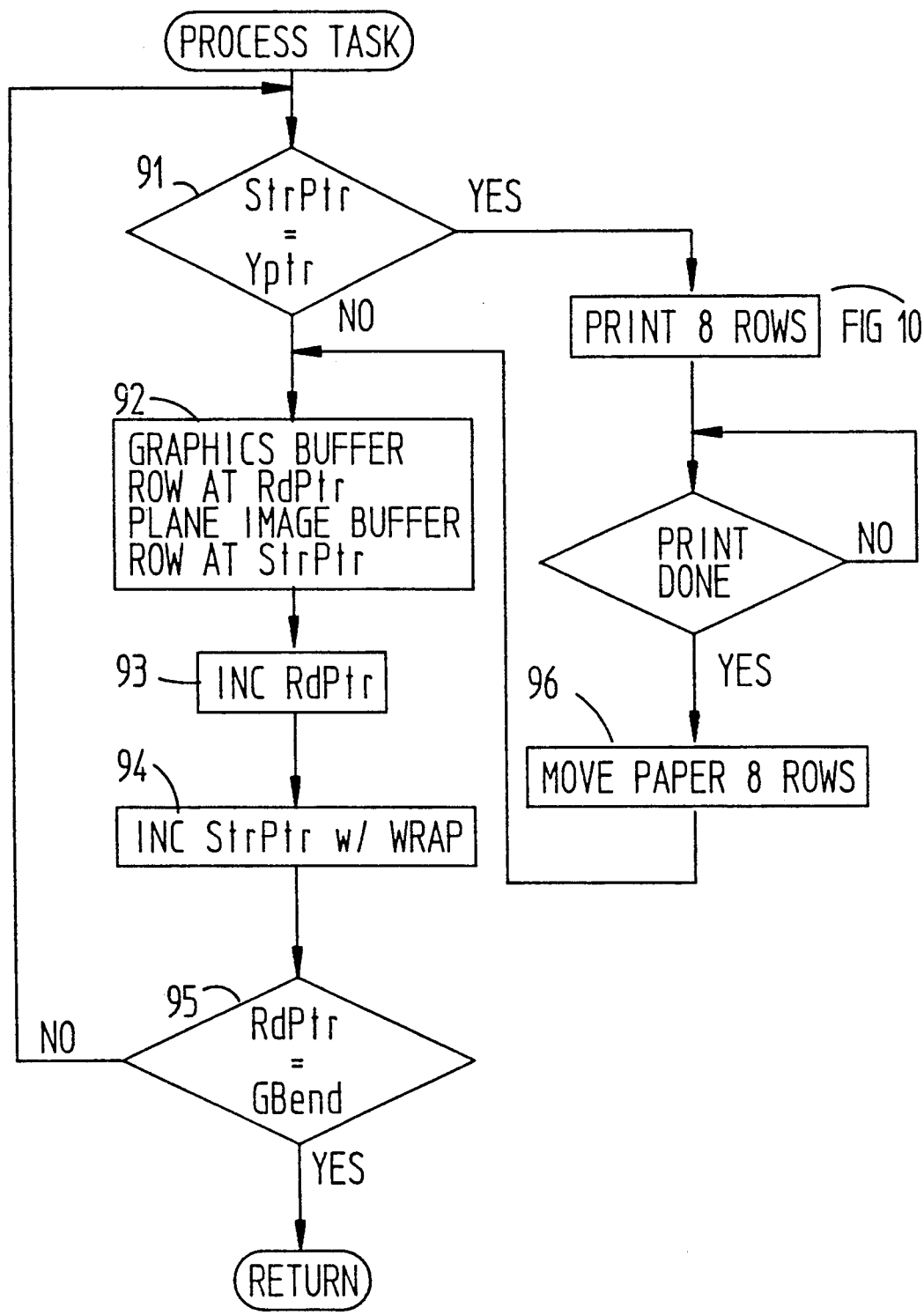
FIGS. 8 through 17 illustrate a preferred embodiment for implementing the printing strategy illustrated in FIG. 3, in which ——

After each pass, new data, if available, is moved from the Graphics Buffer (28) into the Plane Image Buffer for processing (FIG. 8). Once the plane Image Buffer becomes full, space is made available by printing 8 rows of graphics.

Overview of the Data Transformation Process

Figure 9:
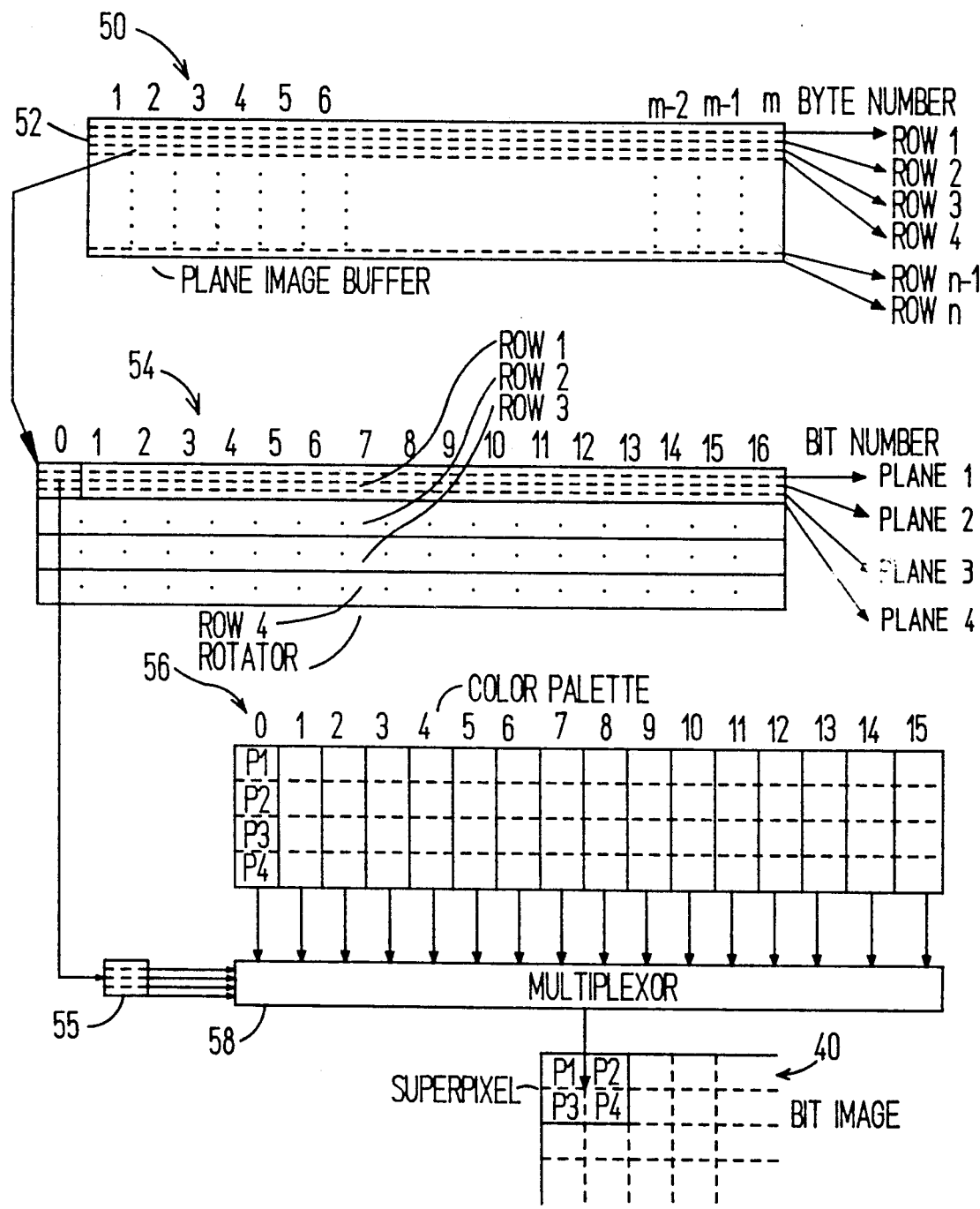

FIG. 9 is a conceptual diagram illustrating the preferred method of transforming multi-plane raster graphics data from the plane image buffer 50 to form superpixel bit image data in the bit image buffer 40.

Referring to FIG. 9, graphics data is processed in two strips per color primary, each four rows tall. Each strip is further broken into blocks that are four rows tall and two bytes wide, for example, block 52 in the plane image buffer 50. Each block is moved into a Rotator (memory space) 54 for processing.

The Rotator 54 is used to gain access to the individual bits within each pixel of graphics data. Data coming from the Rotator is a concatenation of bits from each of the planes within a graphics row. The concatenated bits are in a form suitable for use as an index into the color palette 56. Each of the four rows in the Rotator are processed before advancing to the next bit position. Superpixel data are stored in the bit image buffer in positions corresponding to the bit, byte and row in the plane image buffer (50 in FIG. 9) of the data that selected the superpixel configurations.

The pixel data is processed with respect to each primary color, one color at a time, as follows. The primary configuration data shown in Tables 1 through 3 is loaded into a color palette 56, one primary color (i.e., one Table) at a time. The four bits of data for each pixel are used as an index to control a multiplexor 58. Multiplexor 58 selects one of the 16 columns of data in the color palette 56, corresponding to a desired pixel color. The four bits of data in the selected column in the color palette (P1-P4), corresponding to the four cells of a superpixel, are copied into appropriate locations in the bit image buffer 40. These bits indicate the appropriate deposition of the current primary color, if any, in the cells of the superpixel. This process is described in greater detail with reference to FIG. 10.

A preferred method of implementing the printing strategy described above, incorporating the superpixel configurations of FIG. 3, is described next.

Process Task

In general, the process task 32 of FIG. 4 moves data from the graphics buffer 28 into the plane image buffer 50 until the graphics buffer is empty or the plane image buffer is full. The graphics buffer is sized to hold eight raster rows of graphics data. After it is filled, the system prints the eight rows of graphics data, advances the paper by eight rows, and repeats the process by moving new data from the graphics buffer into the plane image buffer.

The plane image buffer has a number of rows that corresponds to the total height of the print head illustrate in FIG. 1. That print head includes a total of 48 print nozzles, and has four pixels of spacing between each section, for an overall print head height of 56 pixels. The plane image buffer has 28 rows of image data which, when transformed into superpixels (each superpixel being two pixels high), corresponds to the height of the print head. Accordingly, when the plane image buffer is full, the data for the full height of the print head is ready to be printed.

Referring to FIG. 8, Process Task begins by comparing the store pointer to the Y primary pointer Yptr to determine whether the plane image buffer is full (91). If so, eight rows are printed. After printing is completed, the paper is advanced by eight rows (96) and new data is acquired. In step 92, a row of graphics data is moved from the graphics buffer 28, row RdPtr (read pointer) into the plane image buffer 50, row StrPtr (store pointer). RdPtr is incremented (93). Next, the StrPtr is incremented with wrap around (94). Then the value of RdPtr is compared to the value of GBend to determine if the data in the graphics buffer 28 is exhausted (95). If so, the process task is completed. If not, control returns to step 91 and the foregoing steps are repeated.

Figure 10:
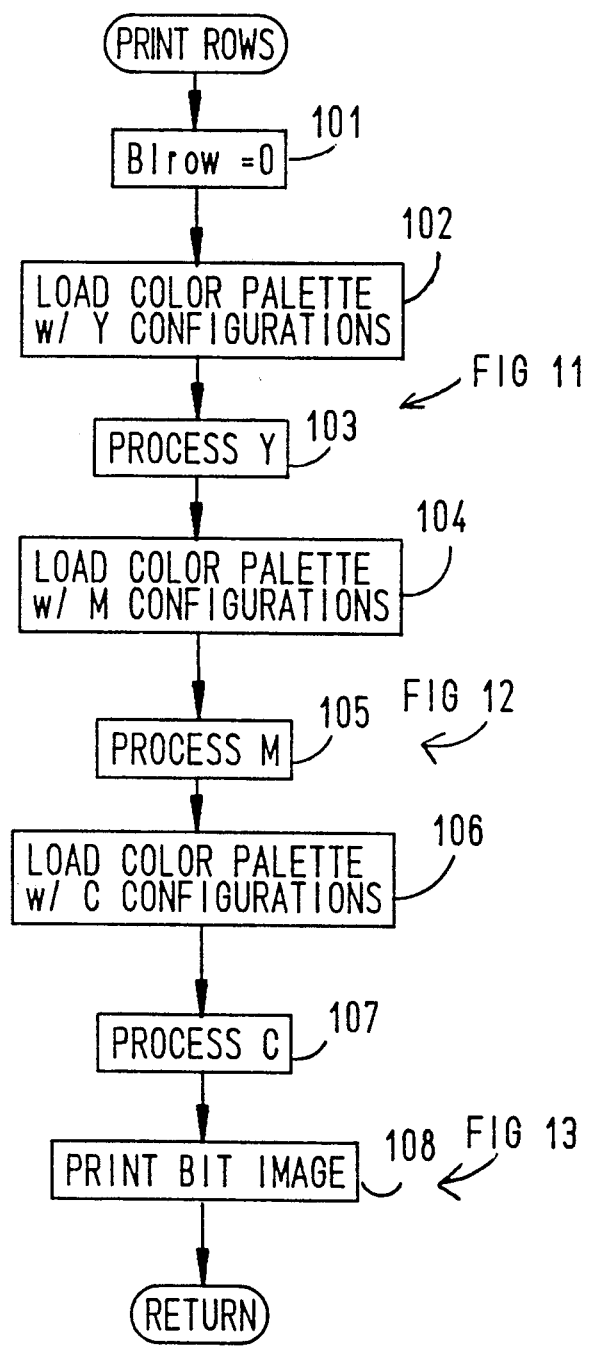

FIG. 10 is a flow chart of the Print Rows step of the process task flow chart of FIG. 8. FIG. 10 shows the following steps:

1. a bit image buffer row pointer BIrow is initialized to 0 (101).
2. color palette (56 in FIG. 9) is loaded with the yellow primary superpixel configurations from Table 1 (102).
3. the yellow primary color is processed (103).
4. the color palette is loaded with the magenta primary superpixel configurations from Table 2 (104).
5. the magenta primary color is processed (105).
6. the color palette is loaded with the cyan configurations (106).
7. the cyan data is processed (107); and
8. the bit image is printed (108).

Figure 11:
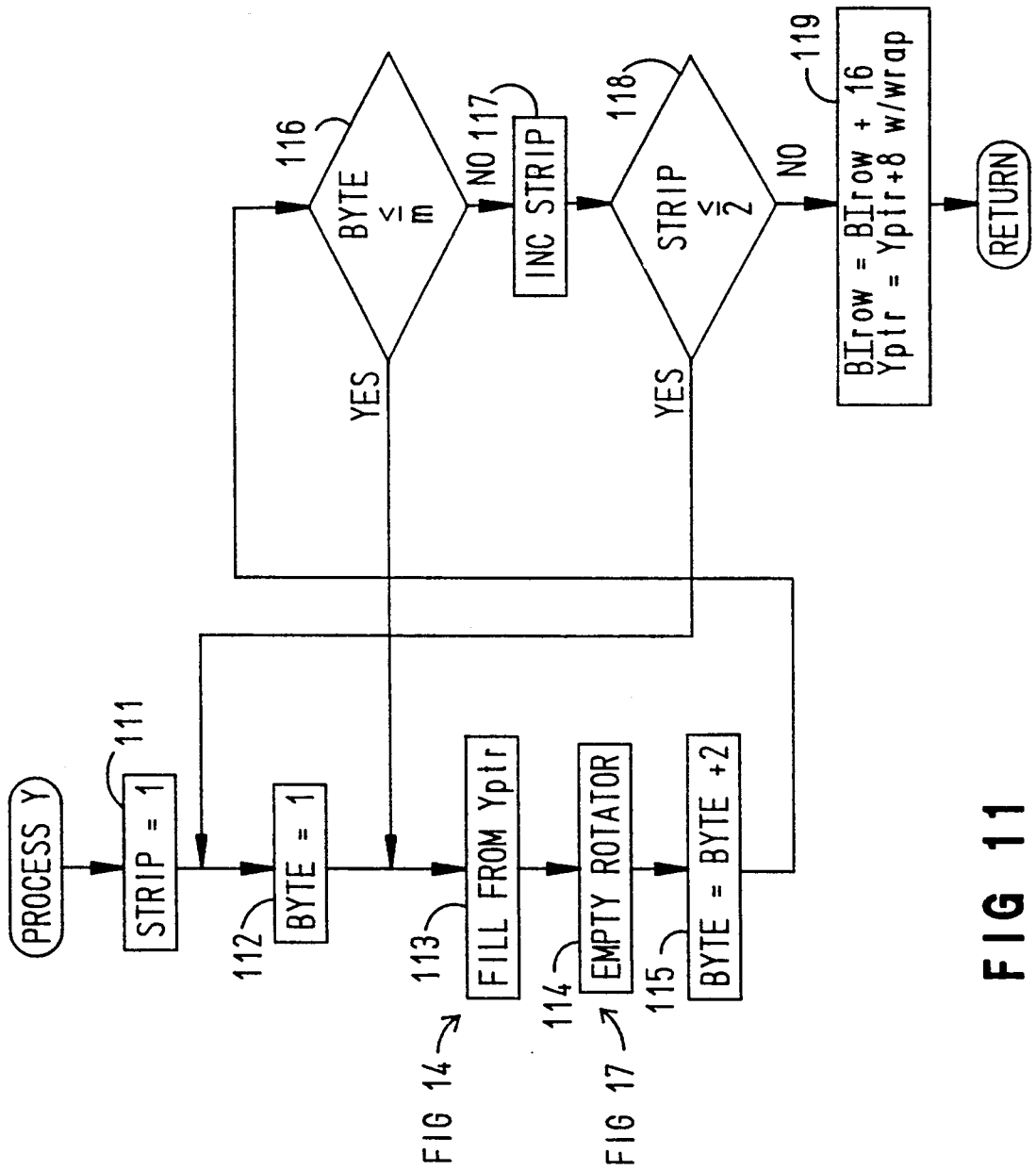
Figure 12:
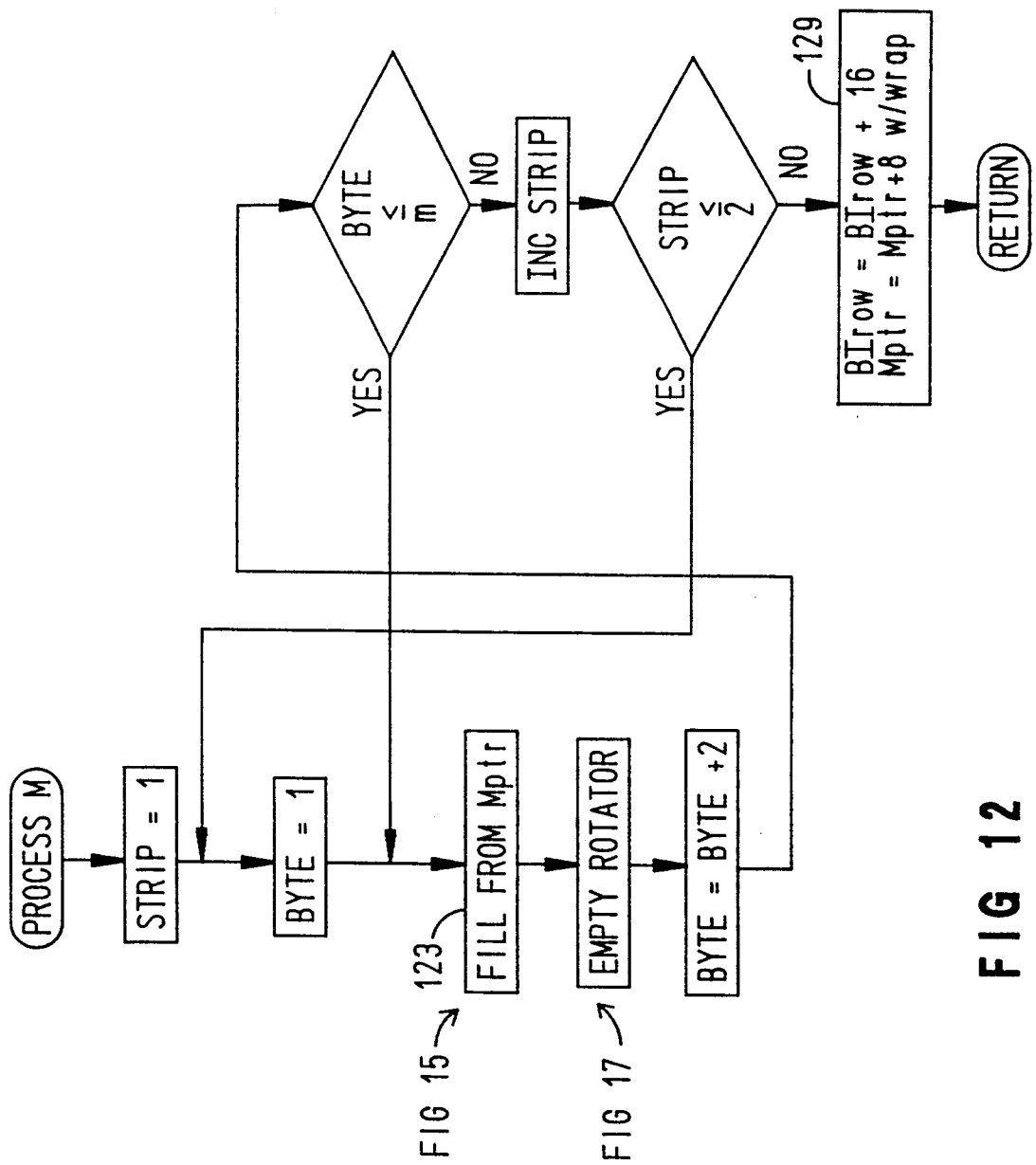

Processing each of the primary colors, steps 103, 105 and 107 in FIG. 10, are shown in greater detail in the flow charts of FIGS. 11-13, respectively. Processing is essentially the same for each primary color. Referring to FIG. 11, it proceeds as follows:

1. initialize a Strip number to 1 (111).
2. initialize a Byte number to 1 (112).
3. load one block of data (two bytes by four rows tall) from the plane image buffer starting at row Yptr into the rotator (54 in FIG. 9) (103).
4. empty the rotator as further described below with reference to FIG. 17 (104).
5. increment the Byte number by two (105).
6. test the Byte number (106) to determine whether the number of bytes has reached the end of the rows (byte m) in the plane image buffer.
7. if not, i.e., if Byte is less than or equal to m, process the next adjacent block (consisting of the next most significant two byte by four rows tall), by repeating steps 113-116. These steps are repeated until a complete strip comprising m bytes by four rows has been processed.
8. increment the Strip number (117).
9. test the Strip number to determine whether two strips have been processed (118).
10. if not, steps 112 through 117 are repeated to process the second strip of data.
11. after eight complete rows (i.e., two strips) of data have been processed, the bit image buffer pointer BIrow is incremented by 16 and Yptr is incremented by eight with wraparound, indicating that eight rows of data have been processed with respect to the Y primary color (step 119).
12. control returns to step 103 in the flow chart of FIG. 10. BIrow is increased by 16 because processing eight rows of graphic plane data forms 16 rows of pixel data in the bit image buffer 40 (FIG. 9).

Processing the M and C primary colors are shown in the flow charts of FIGS. 12 and 13 respectively. These processes are essentially the same as just described with reference to FIG. 11, except that in processing the M and C primaries, the rotator is loaded with pixel data beginning at row numbers indicated by pointers Mptr and Cptr, respectively of the plane image buffer (steps 123, 133), and the respective pointers are updated (steps 129, 139).

Loading and Emptying the Rotator

Referring again to FIG. 10, recall that, prior to processing each of the three primary colors (steps 103, 105 and 107), the corresponding primary configuration is loaded into the color palette (56 in FIG. 9). Processing each primary color includes loading and emptying the Rotator.

Figure 14:
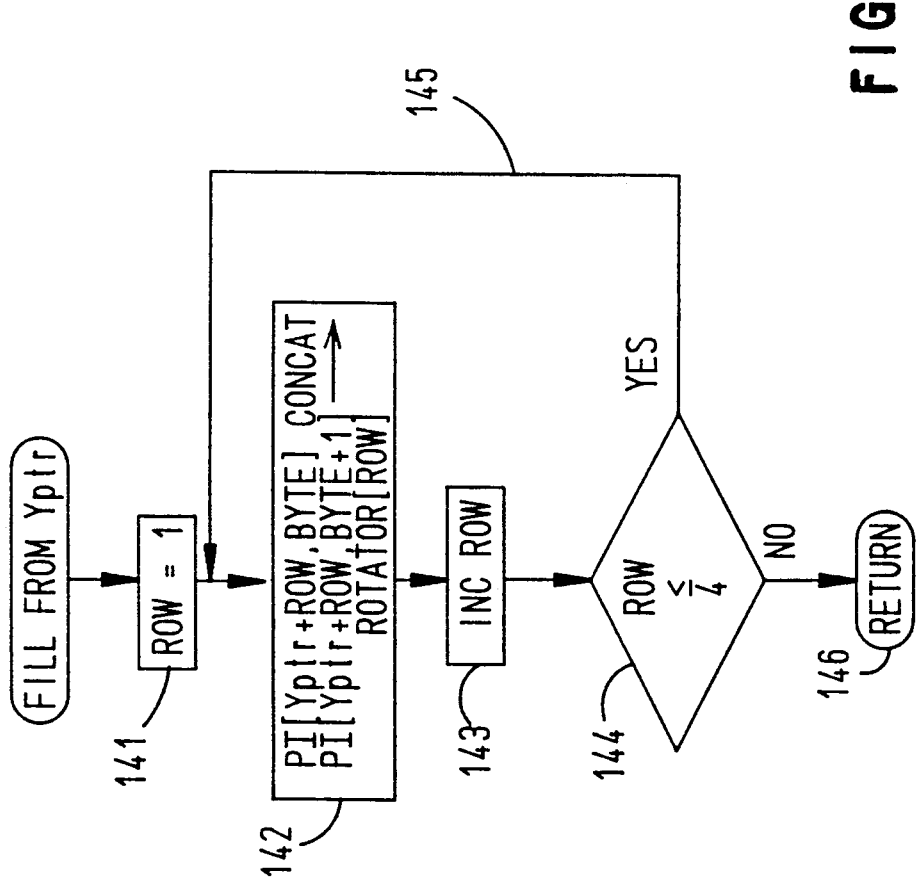
Figure 15:
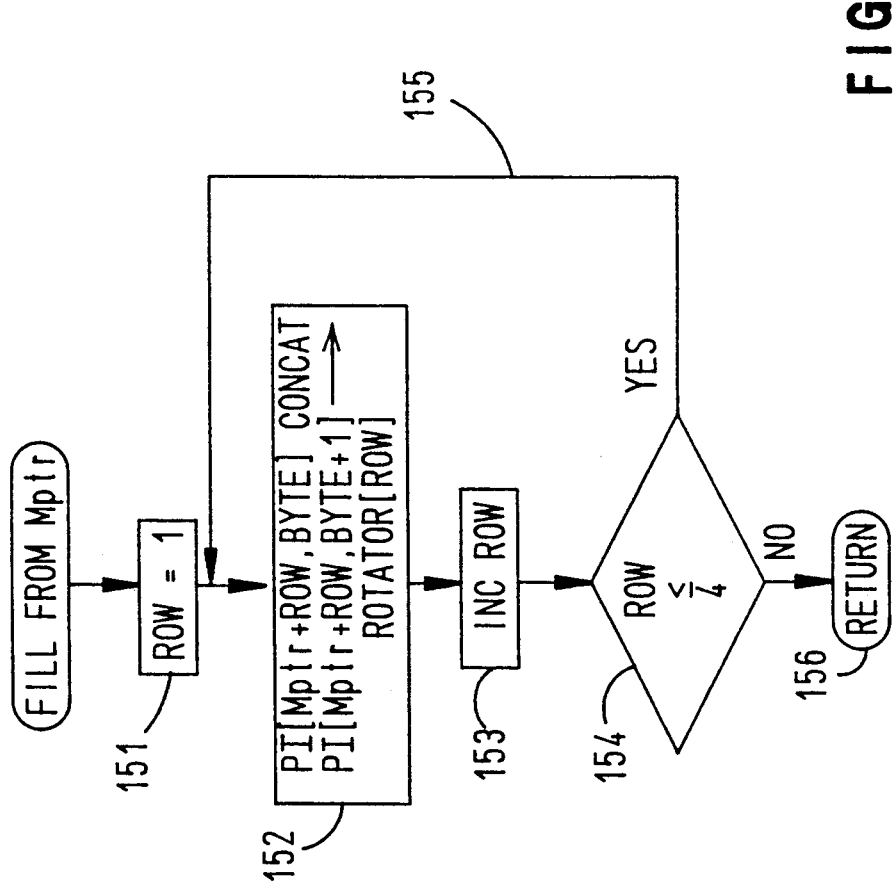
Figure 16:
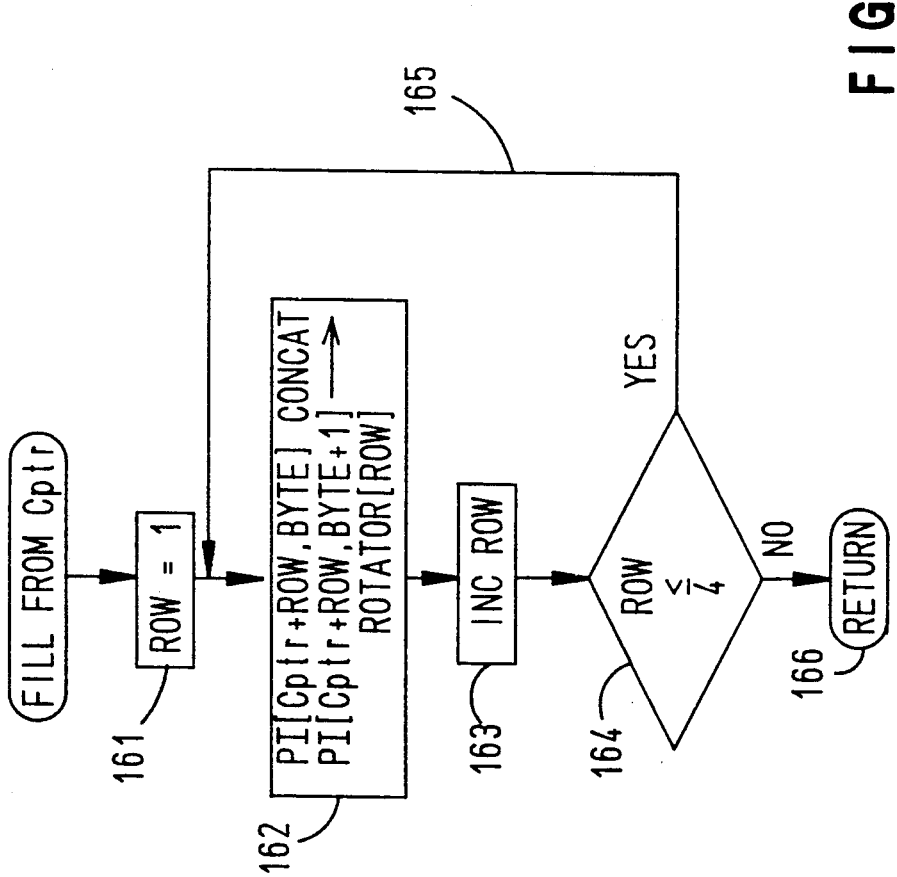

Loading the Rotator is described in the flow charts of FIGS. 14 through 16. These flow charts are similar to each other, except that each of them loads pixel data from different rows of the Plane Image Buffer, in accordance with a respective one of the row pointers, Yptr, Mptr and Cptr, respectively.

Referring to FIG. 14, Loading the Rotator begins by initializing a row number to 1 (step 141). Two bytes of data are moved from the Plane Image Buffer into the Rotator at the current row number (142). The data are taken from a first buffer location, defined by a row number equal to Yptr +row and the current byte number; (PI[Yptr +Row, Byte]) concatenated with the next more significant byte, taken from a second location: PI[Yptr+Row, Byte+1]. (The current byte number is determined in the process shown in the flow chart of FIG. 11.)

Next, the row number is incremented (143). A loop (145) that includes the foregoing loading and increment steps is executed until a test 144 indicates that the row number is greater than 4. A block of data, 2 bytes wide and 4 rows tall, thus is loaded into the Rotator. Control then returns (146) to the flow chart of FIG. 11 at step 113. The Rotator is emptied, as described below, before it is loaded again with new data. Each time this Fill from Yptr process is invoked by the Process Y (FIG. 11), the current byte number will have been incremented by 2. The corresponding processes for loading the Rotator for processing the magenta and cyan colors is shown in the flow charts of FIGS. 15 and 16, respectively.

Empty Rotator (114) is the process by which primary configuration data is looked up in the color palette and moved into appropriate locations in the bit image buffer. In general, the Empty Rotator process looks up four bits of data in the color palette for each pixel of graphics data, and moves (copies) those four bits into four adjacent locations in the bit image buffer. The Empty Rotator process consumes the four rows (16 pixels each) of data, four planes deep, in the Rotator.

Figure 17:
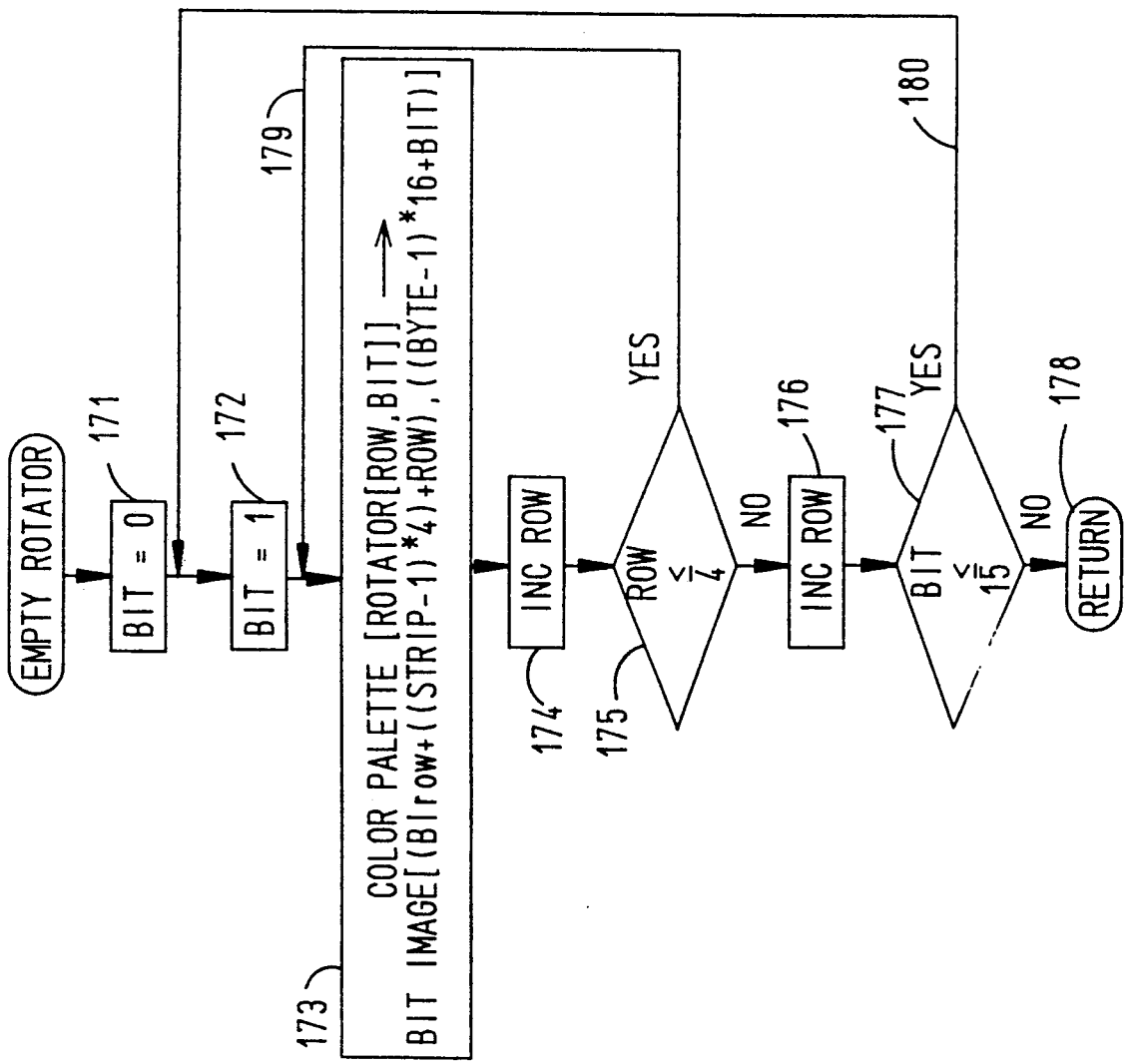

Referring to FIG. 17, Empty Rotator begins by initializing a bit number ("Bit") to 0 (171), and initializing a row number ("Row") to 1 (172). Next, data from the color palette is loaded into the bit image buffer (173). The data are taken from an address or location in the color palette defined by the current row and bit numbers in the rotator. The rotator has four planes of data for each bit position. The four bits of data are provided from the rotator as an index into the color palette. Referring to FIG. 9, these bits are provided to a multiplexor 56 for selecting one of the 16 columns of the color palette.

The destination row address in the bit image buffer is BIrow plus ((Strip −1)* 4)+Row. The row address is offset by four rows for processing the second strip; i.e., when Strip=2, ((Strip −1) * 4)=4. This is because the Empty Rotator process is invoked once for each block (2 bytes×4 rows) of data (see FIG. 12).

The destination bit position in the bit image buffer is equal to (Byte −1) * 16+Bit. This formula offsets the bit location by 16 for each byte as the process proceeds across the plane image buffer (50 in FIG. 9), and further offsets the bit location by the current bit number in the empty rotator process. Each column in the color palette provides four bits of data. The four bits of data from the color palette are loaded into the bit image buffer 40 in a superpixel configuration as shown in FIG. 9.

Next, the row number is incremented (174). In step 175, the row number is tested to determine whether it is less than or equal to 4. Steps 173, 174 and test 175 form a loop 179 which is repeated until four rows of pixel data in the rotator have been processed to form a corresponding eight rows of superpixel data in the bit image buffer.

Next, the bit number ("Bit") is incremented (176) and then tested to determine whether the bit number is less than or equal to 15 (177). If so, control is transferred over a loop 180 back to step 172 to re-initialize the row number ("Row"). The foregoing process is then repeated for the next row of data in the rotator to fill in the corresponding next row of image superpixel data. This process continues until one block of data (16 bits by four rows) is processed.

Process control then returns (178) to step 115 in FIG. 11 (or to the corresponding steps in FIGS. 12 or 13 for subsequent primary colors). At that point (referring to FIG. 11), the byte number incremented by two (115) and the process described above for processing one primary color continues with loading the next block of data in step 113, and so on until the yellow primary processing is completed. Then control returns to step 104 (FIG. 10) for processing the remaining primaries in similar fashion.

The foregoing methods provide a preferred means of assembling superpixel configurations for controlling the print head. Any superpixel configurations may be implemented in similar fashion, though the configurations shown above in FIG. 3 are preferred for general applications. To implement other configurations simply requires making corresponding changes to the configuration data (Tables 1 through 3) that is loaded into the color palette.

FIG. 18 is an enlarged representation of an image printed according to the present invention. The image consists of a red field 62 adjacent a blue field 64. The image is eight row or pixels tall, corresponding to four rows of graphic data. In the upper left portion of the figure, dashed lines 68 indicate an area of the image corresponding to three superpixels. Each of the three superpixels includes a yellow drop of ink in cell number 1 and both yellow and magenta in cell number 4. Dashed line 66 indicates the boundary between these adjacent fields of different colors. It may be observed that the superpixel printing strategy yields the following results. First, only half the pixels or cells are printed on forming a checkerboard pattern, so that only diagonally adjacent cells are printed. Second, none of the overprinted cells is adjacent another overprinted cell, so that bleeding is minimized. Actual color images printed in this fashion exhibit a print quality and appearance superior to those printed by previously know methods.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

I claim:

1. In a color liquid ink printing system wherein units of liquid ink are deposited on a substrate, a method of printing a pixel of graphics data so as to prevent bleeding of the liquid ink across color field boundaries, the method comprising:

defining as an image superpixel an area of the substrate corresponding to the pixel and consisting of a 2 by 2 array of cells;

within the superpixel, selecting a diagonally adjacent pair of the cells; and depositing first and second respective units of ink on two diagonally adjacent areas of the substrate corresponding to the selected pair of cells, while leaving white two diagonally adjacent areas of the substrate in positions corresponding to the nonselected pair of cells in the superpixel.

2. A method according to claim 1 including depositing a third unit of ink on a selected one of the areas of the substrate corresponding to the selected pair of cells, so that three units of ink are deposited on two diagonally adjacent areas of the substrate corresponding to the selected pair of cells in the superpixel.

3. A method according to claim 2 wherein the printing system includes a plurality of primary printing colors of liquid ink and the pixel of graphics data includes an indication of an image color, and including:

selecting a pair of the primary printing colors that combine to form the indicated image color;

utilizing liquid ink of one of the selected pair of colors as the first and second units of ink; and utilizing liquid ink of the other one of the selected pair of colors as the third unit of ink, thereby forming an image superpixel perceivable as having the indicated image color.

4. A method according to claim 1, wherein the graphics data includes an array of pixels of graphics data for printing on a desired area of the substrate, the method including:

mapping each pixel of graphics data to a corresponding one of said image superpixels to form an array of image superpixels corresponding to the desired area;

for each image superpixel in the array, selecting a predetermined diagonally adjacent pair of the cells; and depositing ink on areas of the substrate corresponding to the selected pair of cells in each image superpixel in accordance with the corresponding pixel data, while leaving white the nonselected pair of cells in each superpixel, thereby forming a checkerboard pattern of ink spots deposited in said cells on the desired area of the substrate.

5. A method according to claim 1, wherein the printing system includes a plurality of primary printing colors of liquid ink and the pixel data includes an indication of an image color, said depositing step including:

determining the indicated image color from the pixel data; and if the indicated color is one of the primary printing colors, selecting one of the selected pair of cells and depositing one unit of ink of the indicated color on an area of the substrate corresponding to the selected cell, thereby printing the pixel data at approximately 25% color saturation.

6. A method according to claim 5 including, if the indicated image color is one of the primary printing colors, depositing a second unit of ink of the indicated color on the other one of the selected pair of cells, thereby printing the pixel of graphics data at approximately 50% color saturation.

7. A method according to claim 1, wherein the printing system includes a plurality of primary printing colors of liquid ink and the pixel data includes an indication of an image color, said depositing step including:
determining the indicated image color from the pixel data; and
if the indicated color is not one of the primary colors:
selecting first and second ones of the primary colors that combine to form the indicated color;
depositing one unit of ink of the first primary color on a first one of the selected pair of cells; and
depositing one unit of ink of the second primary color on the other one of the selected pair of cells, thereby forming an image superpixel perceivable as having the indicated image color.

8. A method according to claim 7 including depositing a second unit of ink of the first primary color on said other one of the selected pair of cells.

9. A method according to claim 1 wherein said depositing step includes:
depositing up to two units of ink on a first one of the selected pair of cells;
depositing up to two units of ink on the other cell of the selected pair, thereby leaving white a diagonally adjacent pair of cells complementary to the selected pair; and
limiting to three the total number of units of ink deposited per image superpixel.

10. In a color liquid ink printing system wherein drops of ink of predetermined primary colors are deposited on a substrate in accordance with bit image data, a method of transforming pixels of plane graphics data, each pixel including an indication of a desired image color, to form bit image data, the method comprising:
defining a set of desired image colors including the image colors indicated in the pixels of plane graphics data;
for each one of the set of image colors, defining a corresponding superpixel configuration having four cells arranged in a two by two array, each cell corresponding to a pixel area on the substrate and including data for controlling deposit of drops of ink on the corresponding pixel area of the substrate;
for each pixel of graphics data, selecting a superpixel configuration that corresponds to the indicated image color; and
transforming data from each cell of the selected superpixel configuration to form a corresponding bit of bit image data.

11. A method according to claim 10 wherein defining a superpixel configuration includes:
for each primary color, defining a respective primary configuration corresponding to the superpixel configuration, each primary configuration including a logical datum corresponding to each cell in the superpixel configuration, for controlling deposit of a drop of ink of such primary color on the area of the substrate corresponding to such cell.

12. A method according to claim 11 including:
providing a bit image buffer;
for each primary color, selecting the primary configuration that corresponds to the selected superpixel configuration; and
for each primary color, loading the selected primary configuration data into the bit image buffer.

13. In a color liquid ink printing system wherein units of ink are deposited on a substrate in accordance with bit image data and the system includes a print head having a plurality of primary printing colors, a method of transforming plane graphics data to bit image data for controlling the print head, the method comprising:
providing a color palette;
accumulating a predetermined number of multi-plane rows of graphics data;
loading primary configuration data into the color palette for a selected one of the primary printing colors;
for each pixel of graphics data, concatenating the bits from each of the planes within the graphics row to form an index indicating an image color;
accessing the color palette according to the index to select primary configuration data corresponding to the indicated image color for the selected primary printing color; and
repeating said loading, concatenating and accessing steps to select primary configuration data for each of the primary printing colors, thereby forming bit image data.

14. In a color liquid ink printing system, a method of transforming plane graphics data to form superpixel bit image data, comprising:
loading first primary configuration data;
processing a first N rows of graphics data with respect to the first primary configuration data to form a first 2N (2 times N) rows of superpixel bit image data;
loading second primary configuration data;
processing a second N rows of graphics data adjacent to the first N rows with respect to the second primary configuration data to form a second 2N rows of superpixel bit image data;
repeating said loading and processing steps with respect to subsequent primary configuration data, thereby processing a total number of rows of graphics data equal to N times the number of primary colors to form a number of rows of superpixel bit image data equal to twice the total number of rows of graphics data processed: and
printing the superpixel bit image data.

15. A method according to claim 14, in which processing each pixel of multi-plane graphics data with respect to a primary color includes:
providing a bit image buffer;
providing a rotator;
loading the pixel of graphics data into the rotator;
concatenating the multi-plane bits of the pixel to form an index indicating a desired color;
selecting primary superpixel configuration data from the color palette according to the index; and
loading the selected primary superpixel configuration data into the bit image buffer.

16. A method according to claim 15 wherein the selected primary configuration data includes four bits corresponding to cells of a superpixel defined by a 2 by 2 array of cells and loading the bit image buffer includes loading the four bits into a 2 by 2 bit array of locations in the bit image buffer.

17. A color ink jet printing system comprising:
input means for receiving pixels of multi-plane graphics data, each pixel indicating an image color;
memory means for storing superpixel configuration data for each indicated image color including primary configuration data for each of a plurality of primary printing colors;
a color palette coupled to the memory means for storing primary configuration data for a selected one of the primary printing colors;

rotator means coupled to the input means for concatenating the bits in each pixel to form an index indicating an image color; and means responsive to the index for selecting configuration data in the color palette corresponding to the indicated image color.

18. A system according to claim 17 including a bit image buffer for accumulating bit image data and wherein:

the color palette includes a memory having a plurality of rows and columns for storing primary configuration data, each column corresponding to a respective superpixel configuration and each row corresponding to one cell of a superpixel; and the selecting means includes a multiplexor having an input coupled to each column of the color palette memory, an output coupled to the bit image buffer and control inputs coupled to the rotator means to receive the index for controlling the multiplexor to select the column in the color palette memory corresponding to the indicated image color and provide the selected data to the bit image buffer.

19. A printed product comprising:

a paper substrate; and a plurality of drops of ink deposited on the substrate to form a printed image;

the image including a regular array of image superpixels each consisting of a two by two array of pixel areas on the substrate;

each image superpixel including a first diagonally adjacent pair of the pixel areas in the array and a second diagonally adjacent pair of pixel areas complementary to the first pair; and at least one of the image superpixels including:

a first drop of ink of a first color deposited on one of the pixel areas of the first pair of pixel areas;

a second drop of ink of the first color deposited on the other one of the first pair of pixel areas; and a drop of ink of a second color deposited on said other one of the first pair of pixel areas.

20. A printed product according to claim 19 in which the second pair of pixel areas in each image superpixel are white.

* * * * *